No. 635,117. Patented Oct. 17, 1899.
F. ACKER.
COFFEE POT.
(Application filed Jan. 27, 1899.)

(No Model.)

Witnesses
Inventor
Finley Acker
by Diedersheim & Fairbanks
Attorneys

UNITED STATES PATENT OFFICE.

FINLEY ACKER, OF PHILADELPHIA, PENNSYLVANIA, ASSIGNOR TO FINLEY ACKER & CO., OF SAME PLACE.

COFFEE-POT.

SPECIFICATION forming part of Letters Patent No. 635,117, dated October 17, 1899.

Application filed January 27, 1899. Serial No. 703,529. (No model.)

*To all whom it may concern:*

Be it known that I, FINLEY ACKER, a citizen of the United States, residing in the city and county of Philadelphia, State of Pennsylvania, have invented a new and useful Improvement in Coffee-Pots, which improvement is fully set forth in the following specification and accompanying drawings.

My invention relates to an improvement in coffee-pots; and it consists of a strainer therefor having a perforated base, a mat thereon, and means for preventing the passage of the ground coffee under said mat, as will be hereinafter described.

It further consists of novel details of construction, all as will be hereinafter fully set forth, and particularly pointed out in the claim.

Figure 1:
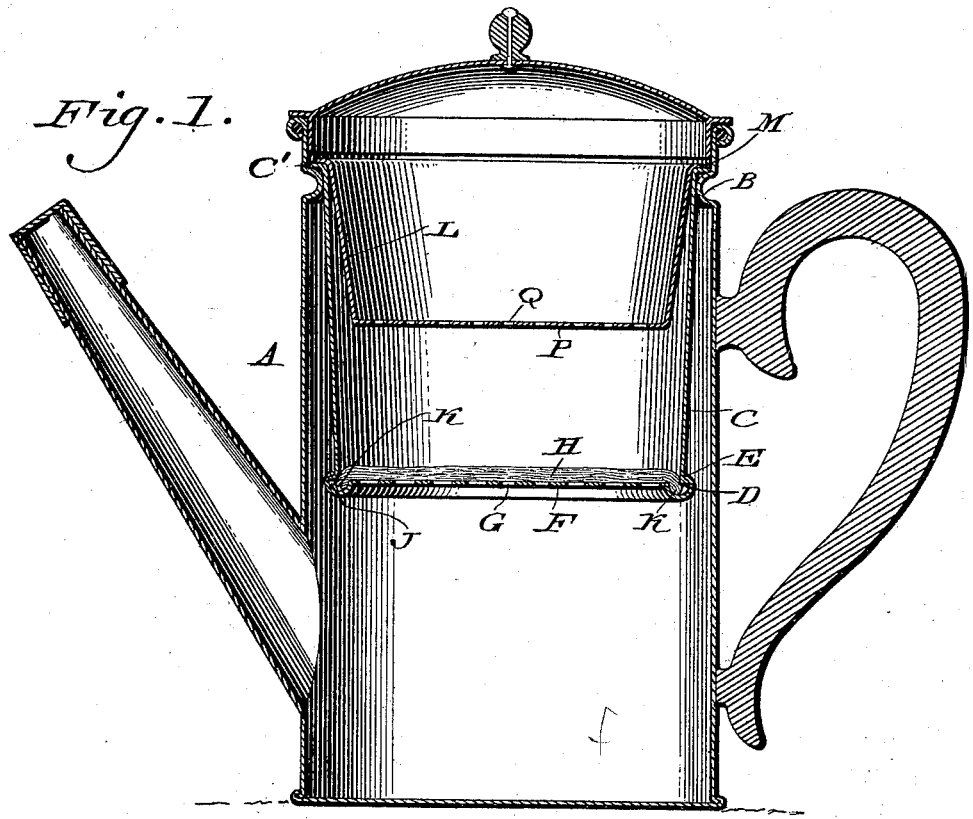
Figure 2:
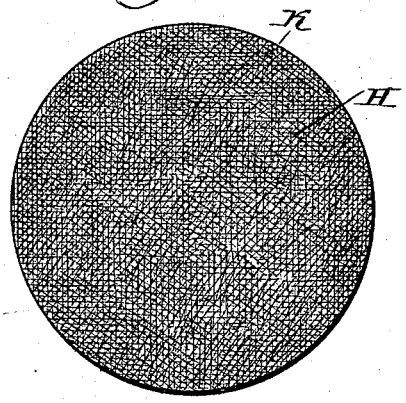

Figure 1 represents a vertical sectional view of a coffee-pot embodying my invention. Fig. 2 represents a plan view of the filtering device employed.

Similar letters of reference indicate corresponding parts in the drawings.

Referring to the drawings, A designates a coffee-pot, the same being provided at the upper portion thereof with an annular inturned bead B, upon which is supported the inner depending vessel C by means of the laterally-extending flange C'. The lower portion of said vessel has the outer annular flange or lip D, which is engaged by the annular wall E of the base portion F, which latter is provided with perforations G, over which is placed a mat H, of supporting and straining or filtering material, for the coffee.

J designates a gutter in the periphery of the base or base portion F, the same receiving the peripheral portion of the mat H, so that said mat completely fills the space at the bottom of the vessel C, while its peripheral portion enters the gutter J, as above referred to, it being noticed that the lower edge of the side of the vessel C and the periphery of the base F are opposite to each other, so as to form a neck which engages with the contiguous parts of the peripheral portion of the mat, thus holding the latter, by which provision the mat is prevented from rising, and the ground coffee on the mat and the water in the vessel are prevented from passing under the mat at the periphery of the latter and escaping through and clogging the perforations of the base F, and thus the fluid coffee proper is caused to pass through the mat and base while being properly strained by said mat.

L designates a percolator which is provided at its upper portion with the outwardly or laterally deflected lip M, whereby it is supported upon the flange C', said percolator being provided with the base P, which has perforations Q in substantially every portion thereof, whereby the boiling water introduced into the percolator will be evenly distributed in fine streams over every portion of the ground coffee on the mat H.

The operation is as follows: The percolator L is first removed from the position seen in Fig. 1 and the desired amount of coffee is placed upon the mat or material H within the vessel C. The percolator is next restored and boiling water poured thereinto, and through the perforated base said water will be evenly distributed upon every portion of the coffee within the vessel C and the ground coffee on the mat subjected to said water, so that the fluid coffee will be found to be of superior quality, strength, and flavor, free from grounds.

The perforations of the base G are large, so that under ordinary circumstances they are unsuitable for purposes of percolation; but the filtering bed or mat that is imposed on said base covers said perforations and so forms a proper percolator, the perforated base as such simply forming the support for said mat.

It will be particularly noticed that the gutter J, which is imperforate, depends below the base F of the vessel, at the lower corner of the latter, and the peripheral portion of the filtering-mat is deflected downwardly, so as to enter said gutter, whereby the coffee-grounds about the side wall of the vessel will lodge on said peripheral portion and tightly press down the same against said gutter as a seal, thus preventing the grounds from escaping under the edge of the mat and passing through the perforations of the base into the lower chamber of the pot.

It is evident that the mat may be readily cut out or otherwise produced into disk shape, it avoiding bags, sacks, or the like appliances requiring to be suspended from above.

Should some of the ground coffee enter the gutter between the deflected end of the mat and outside wall of said gutter, it will pack against said deflected end and force the latter against the inside wall of the gutter, thus increasing the sealing action of said ground coffee around the periphery of the mat.

Having thus described my invention, what I claim as new, and desire to secure by Letters Patent, is—

A vessel formed of a closed side piece and a perforated base-piece, in combination with an imperforate gutter whose outer wall is secured to said side piece and whose inner wall is secured to and supports said perforated base, and a mat which is supported on said base and has its peripheral portion deflected downwardly, said gutter depending below said base and said deflected portion of the mat entering said base.

FINLEY ACKER.

Witnesses:
JOHN A. WIEDERSHEIM,
WM. C. WIEDERSHEIM.